Figure 1:
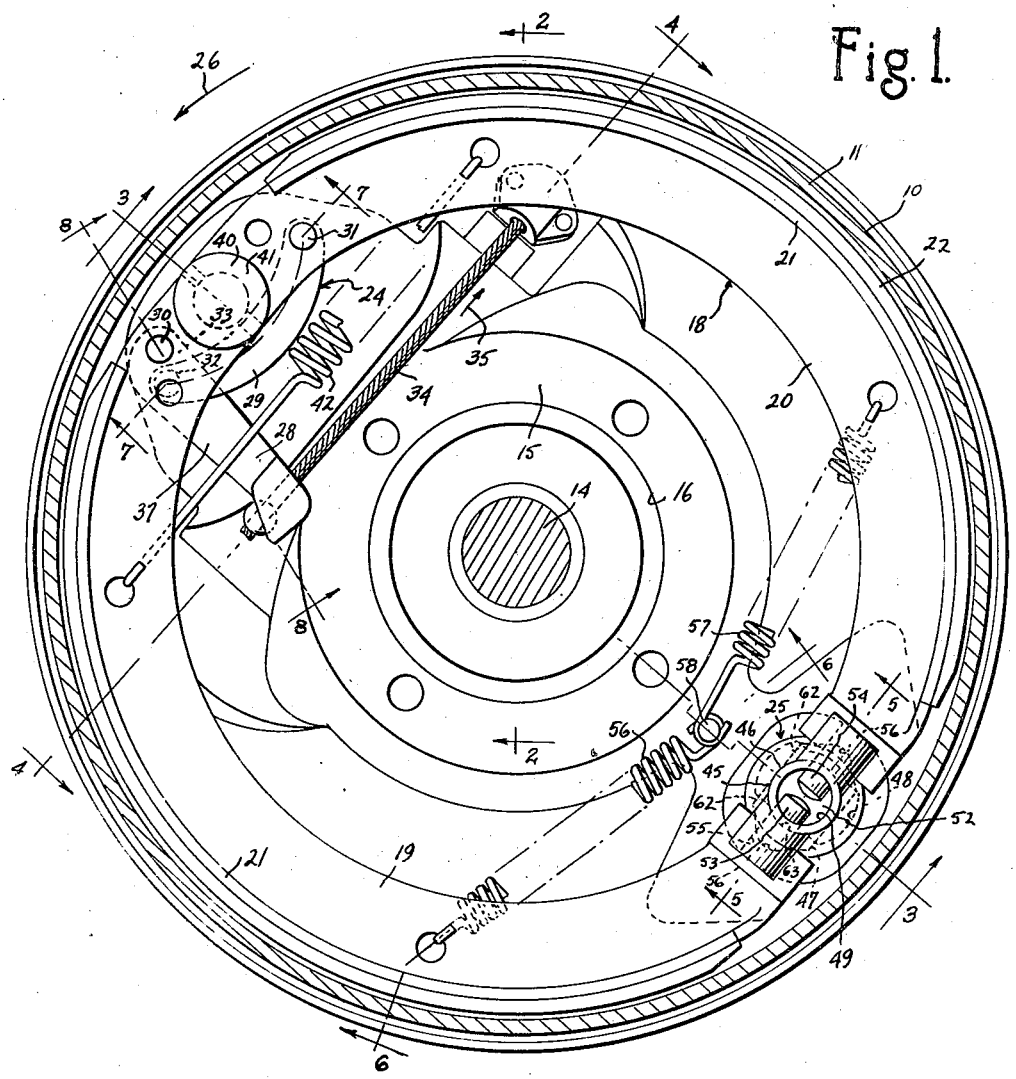
Figure 7:
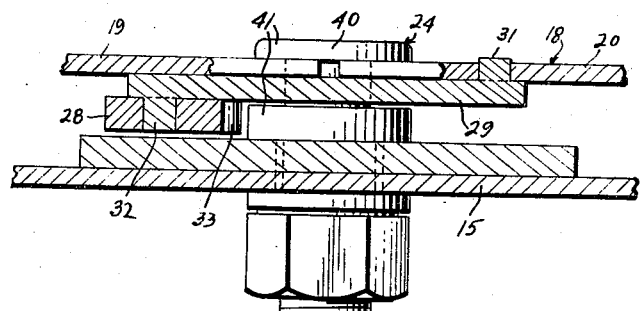

Nov. 21, 1939.   F. L. MAIN   2,181,022
BRAKE MECHANISM
Filed Aug. 16, 1937   3 Sheets-Sheet 1

INVENTOR.
Frank L. Main
BY Whittemore Hulbert & Belknap
ATTORNEYS

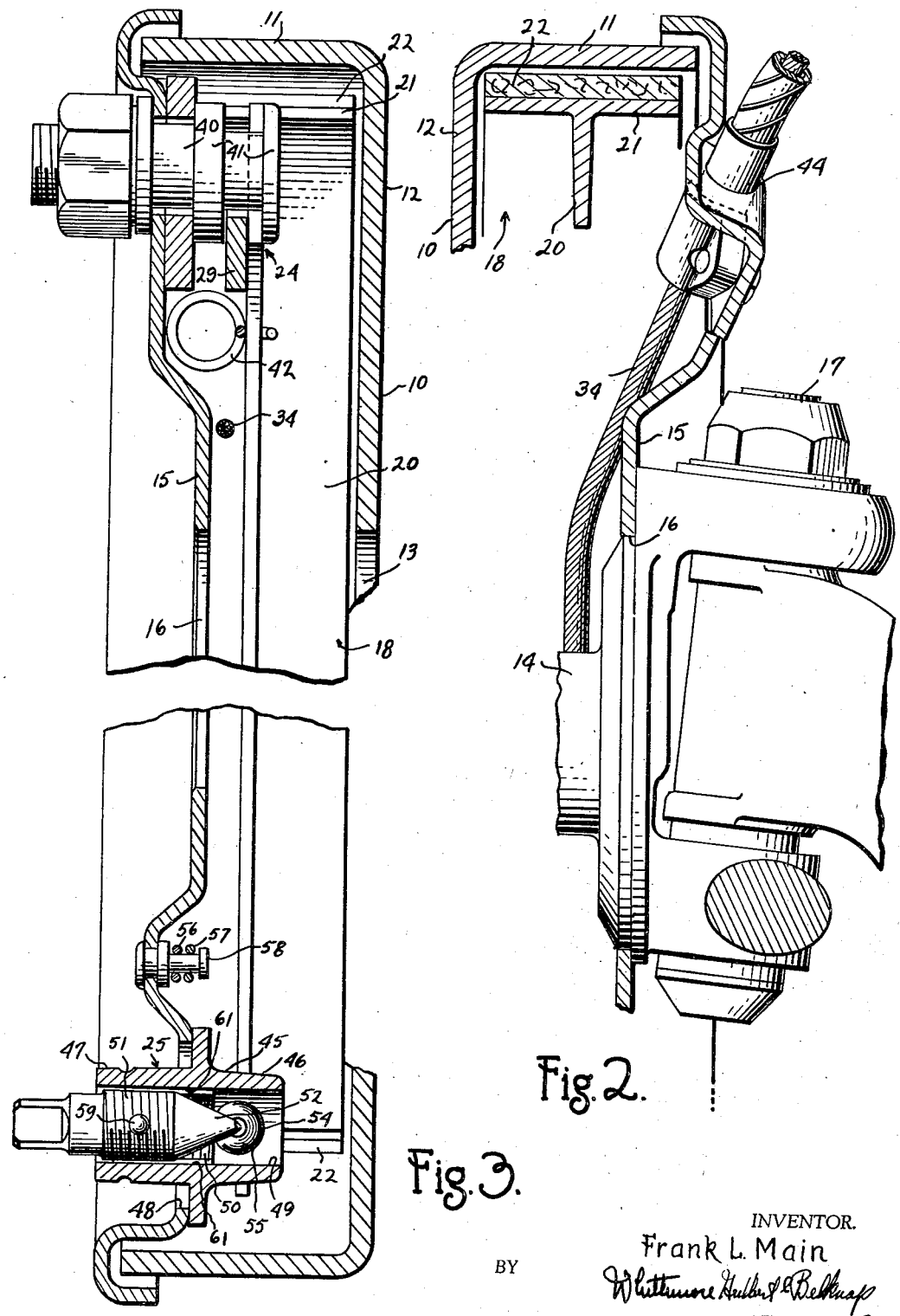

Nov. 21, 1939.    F. L. MAIN    2,181,022
BRAKE MECHANISM
Filed Aug. 16, 1937    3 Sheets-Sheet 3
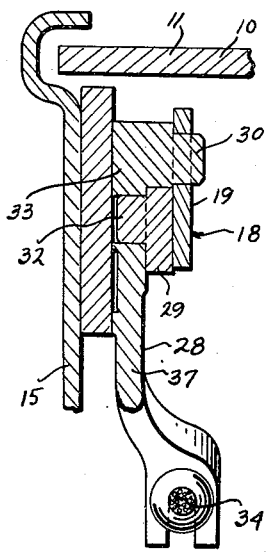
Fig. 8.
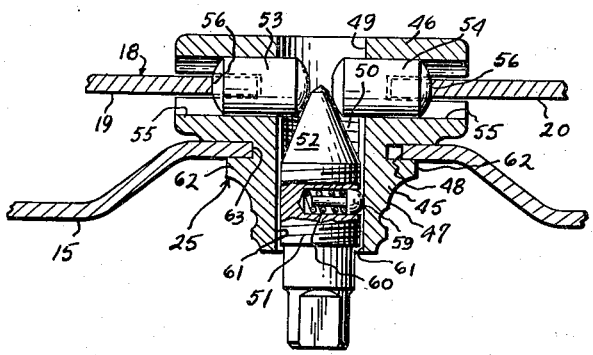
Fig. 5.
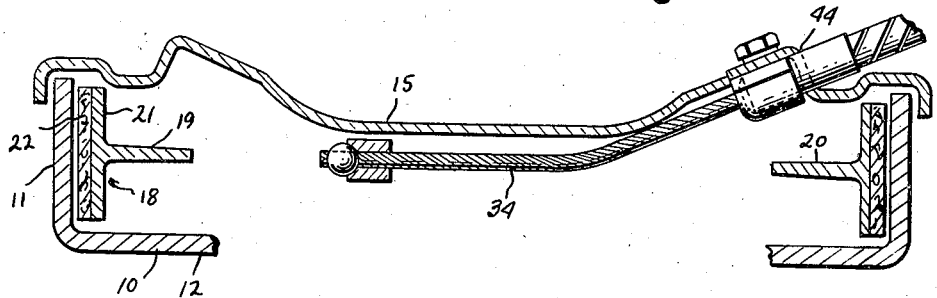
Fig. 4.
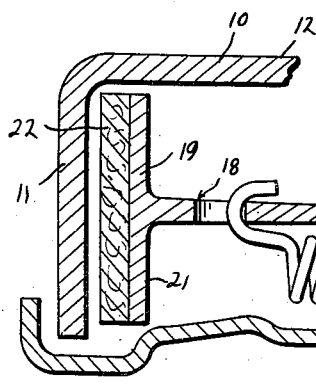
Fig. 6.
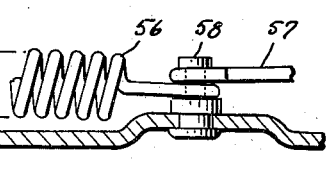
INVENTOR.
Frank L. Main
BY
ATTORNEY.S Patented Nov. 21, 1939

2,181,022

UNITED STATES PATENT OFFICE 2,181,022

BRAKE MECHANISM

Frank L. Main, Birmingham, Mich., assignor to Kelsey-Hayes Wheel Company, Detroit, Mich., a corporation of Delaware Application August 16, 1937, Serial No. 159,389

7 Claims. (Cl. 188—78)

This invention relates generally to brake mechanisms and refers more particularly to improvements in brake constructions of the type employed in association with the wheels of motor vehicles.

One of the principal objects of the present invention resides in the provision of brake mechanism having leverage means for operating the brake friction means rendering it possible to secure the leverage required for effective brake operation with a lever arm sufficiently short to permit extending the operating cable for the arm between the axle and the ends of the friction means to which the leverage means is connected.

Another advantageous feature of the present invention resides in the provision of brake mechanism applicable to the steering wheel of a vehicle and having actuating means of the character set forth in the preceding paragraph wherein the cable extends through the backing plate of the brake drum at a point substantially on the axis of turning movement of the wheel. This construction is advantageous in that it minimizes angular displacement of the cable during steering and provides for reducing the length of the cable required for turning movement of the wheel.

A further object of the present invention consists in the provision of brake mechanism of the leverage operating type wherein servo is obtained when the brake mechanism is applied in the forward direction of rotation of the drum, and wherein the brake operating leverage is less in the forward direction of rotation than in the reverse direction of rotation. Inasmuch as the torque resulting from application of the brake friction means in the forward direction of rotation of the drum is employed to assist movement of the friction means into engagement with the drum, it follows that the pedal pressure required to apply the brake is relatively light and, in view of the fact that the actuating leverage is increased when the brake friction means is applied in the reverse direction of rotation of the drum, it follows that the pedal pressure required to apply the brake in the latter direction is correspondingly reduced. In addition to the foregoing, the present invention contemplates brake actuating leverage means which remains substantially constant throughout brake application and which provides for obtaining movement of the friction means into engagement with the brake drum at a more advantageous angle, commonly referred to in the art as the "attack angle".

The foregoing, as well as other objects, will be made more apparent as this description proceeds, especially when considered in connection with the accompanying drawings, wherein:

Figure 1 is a side elevational view of a brake drum equipped with brake mechanism constructed in accordance with this invention;

Figures 2 to 8, inclusive, are sectional views taken substantially on the planes indicated by the lines 2—2, 3—3, 4—4, 5—5, 6—6, 7—7, and 8—8 of Figure 1, respectively.

The brake selected herein for the purpose of illustrating the present invention is provided with a brake drum 10 having an annular axially extending brake flange 11 and having a web 12 formed with an opening 13 through the central portion thereof for receiving a wheel spindle 14. In accordance with conventional practice, the rear side of the drum is closed by a backing plate 15 having an opening 16 therethrough in alignment with the opening 13 in the web of the brake drum to permit the spindle 14 to extend through the drum and having a portion surrounding the opening 16 adapted to be secured to the spindle 15. Upon reference to Figure 2, it will be noted that the spindle is connected to the axle of the vehicle by means of a king pin 17 arranged on an up and down axis predetermined to provide for the proper turning of the wheel and associated brake drum.

The backing plate 15 forms a support for the brake mechanism and the latter is shown in Figure 1 as supporting brake friction means 18 in the form of a pair of shoes 19 and 20. In the present instance, the shoes are substantially T-shaped in cross section and are supported on the backing plate within the drum with the axially extending portions 21 located adjacent the inner surface of the brake flange 11 on the drum. A brake lining 22 having the desired coefficient of friction is secured to the outer surfaces of the axially extending portions 21 of the shoes for engagement with the inner annular surface of the brake flange 11 when the shoes are moved radially outwardly relative to the drum.

Upon reference to Figure 1, it will be noted that the opposite ends of the shoes are spaced from each other circumferentially of the drum and are located at the top and bottom sides of the backing plate. It will also be observed from the above figure that an actuator 24 is associated with the spaced ends of the shoes at the upper side of the backing plate and that an adjustment anchor device 25 is located between the lower ends of the shoes for the purpose of varying the clearance between the brake linings 22 on the shoes and the adjacent surface of the brake flange. As will be more fully hereinafter set forth, both the actuator and adjustment anchor device permit circumferential movement of the shoes in the forward direction of rotation of the brake drum, designated in Figure 1 by the arrow 26. As a consequence, when the brake shoes are moved by the actuator into engagement with the drum in the forward direction of rotation of the latter, torque is transferred from the primary shoe 19 to the secondary shoe 20, and the resulting servo action assists in applying the brake friction means. On the other hand, when the brake friction means is applied in the reverse direction of rotation of the brake drum, the shoes are anchored by the adjustment device 25 and a symmetrical brake results. However, the leverage at the actuator ends of the shoes is increased when the shoes are applied in the reverse direction of rotation of the brake drum and, accordingly, the pedal pressure required for reverse braking is minimized.

Referring now more in detail to the actuator 24 for moving the brake shoes outwardly into engagement with the brake flange, it will be noted from Figure 1 that this actuator is of the leverage type comprising a lever 28 and a link 29. The lever 28 is pivoted at 30 to the upper end of the primary shoe immediately adjacent the outer surface of the shoe and the link 29 operatively connects the lever 28 to the upper end of the secondary shoe. Upon reference to Figure 7, it will be noted that the link 29 is provided with oppositely extending projections 31 and 32 at the extremities thereof and these projections respectively extend through suitable openings in the upper end of the secondary shoe and the lever 28. As shown in Figure 1, the projection 32 on the link extends through the lever 28 adjacent the pivot 30 to provide the short lever arm 33. The radially inner end of the lever 28 is operatively connected to a cable 34 and the latter extends through the backing plate 15 for connection to a suitable operating control element (not shown).

In the present instance, the pivot 30 is located as closely as practical to the periphery or outer surface of the primary shoe 19, so that the long lever arm 37 affords the desired leverage and yet terminates at its radially inner end in a position which permits extending the cable 34 between the spindle 14 and the actuator ends of the shoes. With this construction, a saving is not only effected by virtue of the minimum amount of material required, but more positive brake operation results because lost motion is appreciably minimized.

Assuming now that the brake drum is rotating in the forward direction indicated by the reference character 26 in Figure 1 and that a pull is exerted on the cable 34 in the direction of the arrow 35 in Figure 1, it will be noted that the lever 28 fulcrums about the pivot 32 and, through the link 29, causes the upper ends of the shoes to move outwardly relative to the brake flange. In other words, the applied force is exerted on the long lever arm 37 and the shoes are moved toward the drum by the relatively short lever arm 33. As soon as the primary shoe is frictionally engaged with the brake flange on the drum, the shoes wrap into engagement with the drum and, although the actuating leverage remains substantially the same, the application of the brakes by the control is assisted by the resulting servo.

Assuming now that the brake drum is rotating in the reverse or opposite direction and that a pull is exerted on the cable 34 in the direction of the arrow 35, it will be noted that as soon as the upper end of the shoe 20 contacts with the brake flange, the lever 28 fulcrums about the pivot 30, instead of the pivot 32. As a consequence, the length of the long lever arm 37 is increased by an amount substantially equal to the distance between the centers of the two pivots, with the result that a greater leverage is exerted on the brake shoes when the drum is rotating in the reverse direction. This is desirable because in the reverse direction, the adjustment device 25 anchors the brake shoes and there is practically no servo action to assist the pedal pressure.

Attention may be called to the fact at this time that the pivot centers of the brake actuating linkage are shown in Figure 1 as being so arranged that the line of action of the two shoes forms substantially a chord of an arc connecting the peripheral portions of the actuator ends of the shoes and does not change sufficiently during movement of the shoes into engagement with the brake flange to cause any appreciable variation in the leverage. In addition, the pivots 31 and 32 are so positioned with respect to the anchor stud 40 between the upper ends of the shoes and the radially inner end of the lever is in such close relationship to the stud that when the shoes are moved outwardly about the stud by the adjustment device 25, any movement of the radially inner end of the lever 28 is negligible and does not require any adjustment in the length of the cable 34. It should also be noted at this time that the actuating linkage is so arranged that the upper ends of the shoes approach the brake drum flange in a substantially arcuate path and this assists in obtaining a smooth controllable brake.

The stud 40 is secured to the backing plate and extends axially forwardly from the backing plate between the upper ends of the friction means to form an abutment for the latter ends when the shoes are in their released positions. As shown in Figure 1, the actuator ends of the shoes are formed with registering recesses in the web portions thereof and these recesses are of sufficient dimension to effectively engage the opposite sides of the stud. In Figure 3 of the drawings, the actuator ends of the shoes are shown as engaging the stud between a pair of axially spaced shoulders 41 on the stud. The shoulders are spaced axially from each other a sufficient distance to not only receive the web portions of the shoes at the actuator ends of the latter, but to also provide for extending the link 29 therebetween. In this connection, it will be noted that the link 29 is arcuate in shape to extend around the stud and provide for the desired relationship of the pivots previously set forth. The purpose of the shoulders is, of course, to prevent axial displacement of the upper ends of the shoes relative to the drum and, in the present instance, the shoulders also assist in holding the link 29 in place. It will also be understood that the stud 40 is predeterminedly located on the backing plate so that when the actuator ends of the shoes are in engagement therewith, the shoes are accurately centered in the brake drum and the latter ends of the shoes are yieldably maintained into engagement with the stud by means of the spring 42 interconnecting the upper ends of the shoes.

It has previously been stated that the cable 34 is extended out of the drum through the backing plate for connection with the brake operating control. Upon reference to Figure 2, it will be noted that the opening 44 in the backing plate through which the cable extends is located substantially on an extension of the king pin axis 17. In this connection, it will be noted that the backing plate is pressed forwardly to provide a recess in the central portion of the backing plate to receive the king pin, and that the opening 44 through which the cable extends is formed in the backing plate beyond the pressed portion thereof so that this opening may be substantially in alignment with the king pin axis. As a result of the above construction, there is less working of the cable upon turning the brake drum around the king pin axis and, as a consequence, interference and wear is reduced to the minimum.

Referring now to the particular construction of the adjustment device 25, it will be noted from Figures 3 and 5 that this device comprises an anchor bracket 45 having a portion 46 located within the brake drum and having a portion 47 extending through the enlarged opening 48 in the backing plate. As shown particularly in Figure 5, the anchor bracket is formed with an axially extending bore 49 therethrough partially threaded, as at 50, to adjustably receive the screw 51. The rear end of the screw extends beyond the portion 47 of the bracket for engagement with a suitable wrench, and the forward end of the screw is provided with a conical portion 52 adapted to extend between a pair of plungers 53 and 54. The plungers are slidably supported in a bore 55 formed in the portion 41 of the bracket and extend at right angles to the bore 44. The adjacent ends of the plungers are semi-spherical in shape for engagement with the conical surface of the adjusting screw and the outer ends of the plungers are similarly shaped to engage the lower ends of the brake shoes. It will be observed from Figures 1 and 5 that the lower ends of the shoes extend into opposite ends of the bore 55 and are formed with semi-circular recesses 56 for receiving the spherical outer end portions of the plungers.

The lower ends of the shoes are maintained into engagement with the plungers and the latter are yieldably urged into engagement with the conical end 52 of the screw 51 by means of retraction springs 56 and 57. The outer ends of the springs are respectively connected to the lower ends of the secondary and primary shoes and the inner ends of the springs are connected to a pin 58 secured to the backing plate. With the above construction, it will be noted that axial adjustment of the screw 51 in the forward direction causes the plungers to move outwardly in the bore 55 and this action, in turn, effects outward swinging movement of the shoes about the abutment 40 at the upper ends of the shoes. In actual practice, the adjustment is effected by manipulating the screw 46 until the friction surfaces of the brake shoes are in engagement with the brake flange and then the screw is backed off the extent required to secure the proper clearance between the shoes and brake flange. In the present instance, accidental movement of the screw 51 is prevented by means of a spring pressed detent 59 supported in a recess in the screw for sliding movement perpendicular to the axis of the screw and normally urged to its outermost position by means of a spring 60 located in the recess. The outer end of the detent is adapted to be successively engaged in recesses 61 extending axially of the bore 44 in circumferential spaced relationship. With this construction, accidental rotation of the screw is yieldably resisted and predetermined increments of adjustment of the screw are indicated by the clicks produced by successive engagement of the outer end of the detent in the recesses 60.

Reference has been made above to the fact that the adjustment device 25 allows limited circumferential shifting movement of the shoes in the forward direction of rotation of the drum and this is accomplished by forming the opening 48 in the backing plate 15 sufficiently larger than the portion of the bracket extending therethrough to permit the desired extent of movement. In actual practice, the opening 48 is so dimensioned that the adjustment anchor device is also capable of sufficient radial movement relative to the backing plate to compensate for drum expansion produced by the heat generated when the brakes are applied.

In the present instance, the bracket is held from axial displacement relative to the backing plate by means of diametrically opposed shoulders 62 arranged to cooperate with the portion 46 of the bracket to receive the edge portions of the backing plate surrounding the opening 48. In Figure 1 of the drawings, the opening 48 is formed to provide diametrically opposed radial extensions of sufficient dimension to receive the shoulders 62 when the bracket is in a position 90° from the location shown in Figure 1. When the bracket is in a position 90° from the one illustrated in Figure 1, the shoulders 62 may be slipped through the extensions of the opening 48 from the inner side of the backing plate to the outer side of the latter. After this is accomplished, the bracket is merely rotated throughout 90° to the position thereof shown in Figure 1 to locate the shoulders 62 in a position where they engage the backing plate opposite the portion 46 of the bracket.

In the released position of the brake, the bracket is engaged with the side 63 of the opening adjacent the lower end of the primary shoe 19 and is maintained in this position by the spring 57 which exerts a greater pull on the secondary shoe 20 than the spring 56 exerts on the primary shoe 19. The foregoing is accomplished herein with springs of the same strength by merely offsetting the pin 58 from a radial plane including the axis of the drum and adjustment device in a direction toward the primary shoe.

In view of the above construction, torque is transferred from the primary shoe to the secondary shoe in the forward direction of rotation of the brake drum to provide the desired servo action and the brake shoes are anchored on the backing plate by the adjustment device when the brake drum is rotating in the reverse direction. In other words, a symmetrical brake results in the reverse direction of rotation of the brake drum and the increased pedal pressure usually required to apply the brake shoes in the reverse direction is overcome by increasing the leverage of the actuating linkage. As a result of the foregoing, an exceptionally smooth and controllable brake is provided in either direction of rotation of the brake drum.

What I claim as my invention is:

1. In brake mechanism, a revoluble brake drum mounted on a spindle for turning movement about an up and down axis, a backing plate for the brake drum, brake friction means supported on the backing plate within the brake drum and having spaced ends, means for moving the brake friction means outwardly for engagement with the brake drum including a lever extending substantially radially of the brake drum and having the outer end pivotally connected to one end of the brake friction means, a link pivotally connecting the lever intermediate the ends thereof to the other end of the friction means, and means for operating the lever including a linear member connected to the radially inner end of the lever and extending in a direction opposite the direction of forward rotation of the brake drum through the backing plate at a point substantially in alignment with the axis of turning movement of the brake drum.

2. In brake mechanism, a revoluble brake drum mounted on a spindle for turning movement about an up and down axis, a backing plate for the drum having a central opening therethrough for receiving a portion of the spindle, brake friction means supported on the backing plate within the drum and having spaced ends, means for moving the brake friction means outwardly into engagement with the drum including a lever extending substantially radially of the drum and having the outer end pivotally connected to one end of the brake friction means, a link pivotally connecting the lever intermediate the ends thereof to the other end of the brake friction means, means for operating the lever including a flexible cable connected to the inner end of the lever and extending in a direction opposite the direction of forward rotation through the backing plate at a point substantially in alignment with the axis of turning movement of the brake drum, and means connecting the cable to said lever.

3. In brake mechanism, a brake drum rotatable in opposite directions, a pair of brake shoes supported within the drum for shifting movement circumferentially of the drum in the forward direction of rotation of the latter and having spaced ends, means associated with the ends of the brake shoes at one side of the drum shiftable with the brake shoes in the forward direction of rotation of the brake drum and effective to anchor the brake shoes in the reverse direction of the brake drum, and means associated with the opposite ends of the shoes for moving the latter into engagement with the brake drum including actuating linkage interconnecting the latter ends of the shoes and proportioned to apply a greater leverage on the brake shoes in the reverse direction of rotation than in the forward direction of rotation of the drum.

4. In brake mechanism, a brake drum rotatable in opposite directions, a pair of brake shoes supported within the drum for shifting movement circumferentially of the drum in the forward direction of rotation of the latter and having spaced ends, means associated with the ends of the brake shoes at one side of the drum shiftable with the brake shoes in the forward direction of rotation of the brake drum and effective to anchor the brake shoes in the reverse direction of the brake drum, means for moving the brake shoes into engagement with the brake drum including a lever extending substantially radially of the brake drum and having the outer end pivotally connected to the primary shoe adjacent the opposite end of the latter, a link pivotally interconnecting the lever adjacent its pivotal connection with the primary shoe to the secondary shoe, and means engageable with the radially inner end of the lever for actuating the latter.

5. In brake mechanism, a brake drum rotatable in opposite directions, a backing plate for the brake drum, a pair of brake shoes supported on the backing plate within the drum for shifting movement circumferentially of the drum in the forward direction of rotation of the latter and having the adjacent ends spaced from each other, an adjustment device extending into an enlarged opening in the backing plate and positioned between the ends of the shoes at one side of the drum and engageable with said ends, yieldable means normally maintaining the adjustment device in engagement with the side of the opening through the backing plate adjacent the primary shoe and providing for shifting movement of the adjustment device with the brake shoes in the forward direction of rotation of the drum, and means associated with the opposite ends of the brake shoes for moving the shoes into engagement with the drum including actuating linkage interconnecting the latter ends of the shoes and proportioned to apply a greater leverage on the brake shoes in the reverse direction of rotation of the brake drum than in the forward direction of rotation of said drum.

6. In brake mechanism, a brake drum rotatable in opposite directions, brake shoes supported within the drum for shifting movement circumferentially of the drum in the forward direction of rotation of the drum and anchored against shifting movement with the drum in the reverse direction of rotation, and means for moving the friction means into engagement with the drum including actuating linkage interconnecting the ends of the shoes at one side of the drum and proportioned to apply a greater leverage on the friction means in the reverse direction of rotation of the drum than in the forward direction of rotation of the drum.

7. In brake mechanism, a brake drum rotatable in opposite directions, a pair of brake shoes supported within the drum for shifting movement circumferentially of the drum in the forward direction of rotation of the latter and having spaced ends, an abutment extending between the ends of the friction means at one side of the drum, means yieldably urging the latter ends of the friction means into engagement with opposite sides of the abutment, means associated with the ends of the brake shoes at the opposite side of the drum shiftable with the brake shoes in the forward direction of rotation of the brake drum and effective to anchor the brake shoes in the reverse direction of rotation of the brake drum, and actuating linkage interconnecting the abutment ends of the shoes and proportioned to apply a greater leverage on the shoes in the reverse direction of rotation than in the forward direction of rotation of the drum.

FRANK L. MAIN.